Jan. 12, 1943.    J. T. WILLIAMS    2,308,138
ELECTRICAL INCENSE BURNER
Filed May 6, 1939

Inventor:
James T. Williams
By F. A. Whitley
Attorney.

Patented Jan. 12, 1943

2,308,138

UNITED STATES PATENT OFFICE 2,308,138

ELECTRICAL INCENSE BURNER

James T. Williams, Minneapolis, Minn., assignor to Margaret L. Williams, Minneapolis, Minn.

Application May 6, 1939, Serial No. 272,237

4 Claims. (Cl. 21—119)

My invention relates to electrical incense burners. It relates more particularly to devices of this character which may be employed in toilets, kitchens and other places where it is desired to counteract or neutralize obnoxious odors. Among the objects of the invention is the provision of a device of this character which may be readily installed in any desired location and by means of which a predetermined charge of incense powder may be delivered from a supply thereof to a heating unit and ignited thereby to cause fumes from the powder to pass into the atmosphere of the room where the device is installed.

The novel features which I believe to be characteristic of my invention are set forth with particularity in the appended claims. The invention it self, however, both as to its organization and method of operation, together with additional objects and advantages thereof, will be best understood from the following description of specific embodiments when read in connection with the accompanying drawing in which, Fig. 1 is a view of one form of the device in vertical section.

Figure 1:
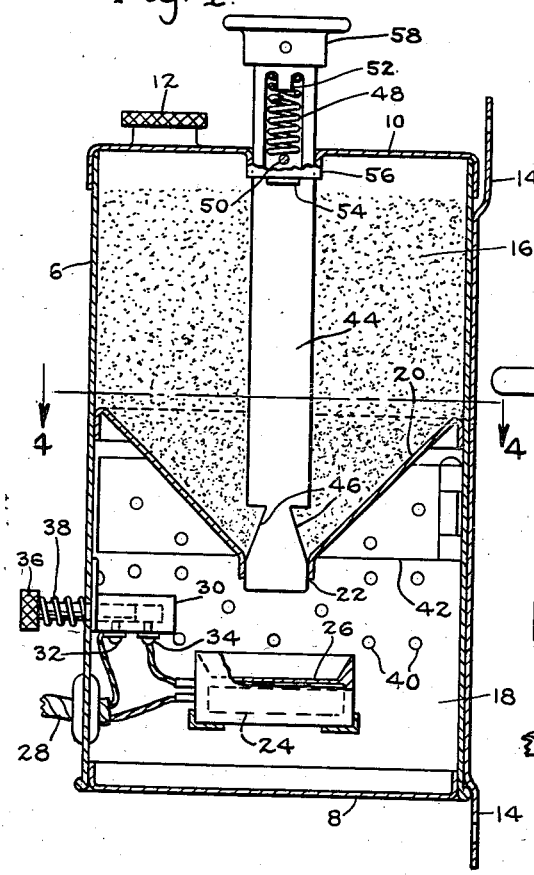

The device as shown in the drawing includes a casing 6 of suitable material having a bottom member 8 and a top member 10 which is provided with a filling opening closed by a cap 12. The casing 6 carries bracket members 14 for attachment to a wall or other suitable support. The casing is separated into an upper compartment 16 and a lower compartment 18 by a hopper-like partition 20, the apex of which is provided with an opening 22 through which incense powder contained in the compartment 16 may be discharged in predetermined quantity into the lower compartment 18. This latter compartment constitutes a burner compartment and for this purpose contains an electrical heating unit 24 the top of which carries a pan 26 for receiving the charges of powder delivered from the compartment 16.

The heating unit 24 is connected in an electrical circuit 28 in which is also connected a normally open switch 30. This switch contains two terminals 32 and 34 adapted to be bridged by the inner portion of a plunger 36 normally held retracted from its bridging position by a spring 38.

The wall of the lower compartment 18 is provided with a multiplicity of perforations 40 for escape of fumes from the burning incense powder. The lower compartment 18 is provided with a door indicated at 42 so that access may be had to the pan 26 for cleaning it and to the electrical elements for purpose of repair. The construction thus far described is common for all three forms of the device shown.

The form of device shown in Fig. 1 contains a vertically reciprocable plunger 44 which near its lower end is pocketed as indicated at 46. The lower end of the plunger 44 extends through the opening 22 and the pocketed portion 46 is normally held above this opening by a spring 48. This spring is positioned in a recess in the upper portion of the plunger 44 and is interposed between a pin 50 and a projection 52, the latter being formed on the plunger at the upper end of the recess therein. The pin 50 is secured to the top member 10 and extends across an opening therein through which the plunger works. The plunger carries a stop 54 which when the plunger is in upper position engages a flange 56 around the opening in the top member 10. This arrangement prevents the plunger from being pulled entirely out of the opening 22 at the bottom of the partition 20. The upper end of the plunger carries a knob 58 by means of which the plunger may be pushed downwardly so that a predetermined charge of powder in the pocketed portion 46 is discharged into the pan 26.

Figure 2:
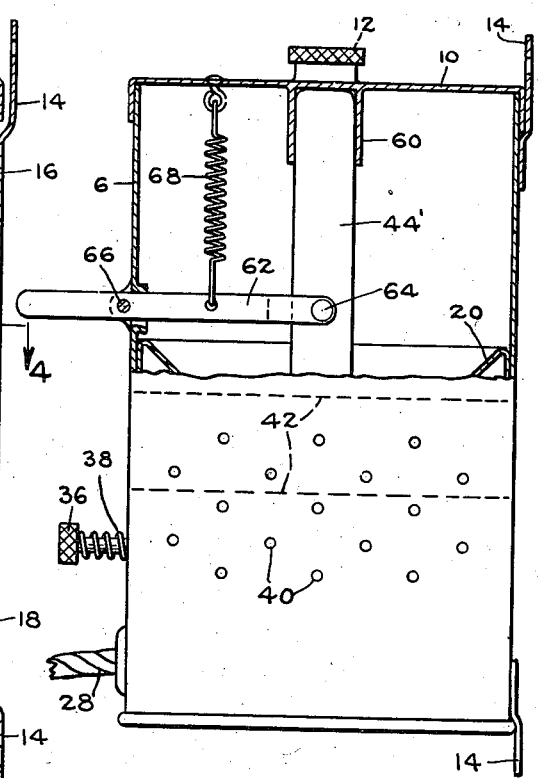
Fig. 2 is an elevational sectional view of a modified form of the device.

In the form of device shown in Fig. 2, there is a plunger 44' whose lower end is formed the same as that of the plunger 44. The upper end of the plunger 44' is received in a flange 60 extendin down from the top member 10, this flange serving to guide the plunger 44' for reciprocating movement. A lever 62 is pivoted at its inner end to a pivot 64 carried by the plunger. The outer end of the lever 62 extends out through an opening in the casing 6 and the lever is intermediately pivoted on a pivot 66 carried by the casing. A spring 68 connecting the lever 62 with the top member 10 normally holds the plunger 44' in upward position. Upon pulling up on the outer end of the lever 62, the plunger is depressed to discharge a predetermined charge of powder into the lower compartment in manner the same as previously described.

Figure 3:
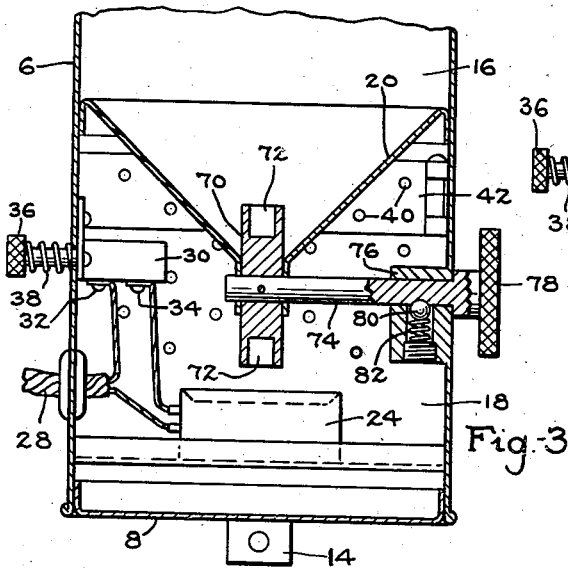
Fig. 3 is a view in vertical section of a further modification.
Figure 4:
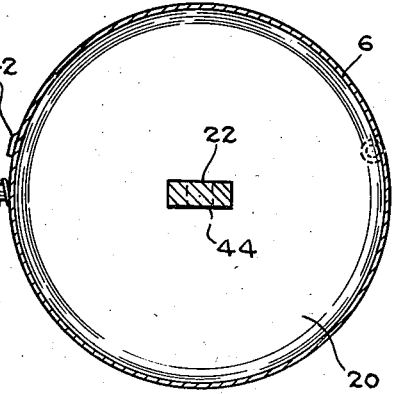
Fig. 4 is a view in horizontal section on the line 4—4 of Fig. 1 looking in the direction of the arrows.

In the form of device shown in Fig. 3, a wheel 70 having pockets 72 in its periphery is mounted for rotation in the opening 22 at the apex of the partition 20. This wheel is secured to the inner end of a shaft 74 which is mounted for rotation in the material surrounding the opening 22. The shaft 74 is also mounted for rotation in a bearing 76 carried by the casing 6, the outer end of the shaft extending through the casing and being provided with a knob 78 by means of which the shaft may be turned. The bearing 76 is provided with a recess which contains a ball 80 backed up by a spring 82 so that the ball resiliently engages in depressions formed in the shaft, the ball therefore serving as a stop.

The operation and advantages of my invention will be apparent in connection with the foregoing description when read in connection with the accompanying drawing. The device may be securely attached by means of the bracket members 14 to the wall or other suitable support so as to be readily accessible to a toilet or in other places such as a kitchen for the purpose of deodorizing and counteracting any bad odors which may be present. Upon operating the plunger or the wheel, a predetermined charge of powder is delivered from the supply in the compartment 16 upon the pan 26 in the lower compartment. The bridging member 36 is then pushed inwardly to complete an electric circuit through the heating unit 24 and heat the powder in the pan 26 until fumes come out into the room through the perforations 40. The bridging member may then be released and the heat which has been supplied will be sufficient to cause the incense powder to continue to smolder and accomplish its purpose.

I claim:

1. An electric incense burner, comprising a casing formed with an upper compartment for holding a supply of incense powder and a lower compartment directly beneath the upper compartment, an opening from said upper compartment directly above the lower compartment, a plunger member extending through the incense in the compartment and having a portion normally closing said opening, a lower compartment within the casing, a burner pan therein below said opening, means associated with the plunger whereby the same may be projected through said opening into the lower compartment, and other means on the plunger for causing a predetermined charge of incense powder to be pushed through the opening to fall upon the pan when the plunger is so projected.

2. An electric incense burner, comprising a casing formed with an upper compartment for holding a supply of incense powder and a lower compartment directly beneath the upper compartment, the lower walls of said compartment sloping toward a common center, an opening extending through said walls at the bottom of the slope thereof, a plunger member extending through the incense in the compartment and having a portion within and of the same size and shape as the opening for closing the same, a lower compartment within the casing, a burner pan therein below said opening, means associated with the plunger whereby the same may be projected through said opening into the lower compartment, and other means on the plunger for causing a predetermined charge of incense powder to be pushed through the opening to fall down upon the pan when the plunger is so projected.

3. An electric incense burner, comprising a casing formed with an upper compartment for holding a supply of incense powder and a lower compartment directly beneath the upper compartment, the lower walls of said compartment sloping toward a common center, a rectangular opening extending through said walls at the bottom of the slope thereof, a plunger member extending through the incense in the compartment and having a rectangular portion within and of the same size and shape as the opening for closing the same, a lower compartment within the casing, a burner pan therein below said opening, means associated with the plunger whereby the same may be projected through said opening into the lower compartment, and cut-away portions on the plunger for engaging and causing a predetermined charge of incense powder to be pushed through the opening to fall down upon the pan when the plunger is so projected.

4. An electric incense burner, comprising a casing formed with an upper compartment for holding a supply of incense powder and a lower compartment directly beneath the upper compartment, an opening from said upper compartment to the lower compartment, a plunger member extending through the incense in the compartment and having a portion normally closing said opening, a lower compartment within the casing, a burner pan therein below said opening, means associated with the plunger whereby the same may be projected through said opening into the lower compartment, other means on the plunger for causing a predetermined charge of incense powder to be pushed through the opening to fall upon the pan when the plunger is so projected, an electric circuit for heating the pan, and self-opening manually-operated switch means for closing the electric circuit.

JAMES T. WILLIAMS.